BERNARD J. NAVARRO
INVENTOR.

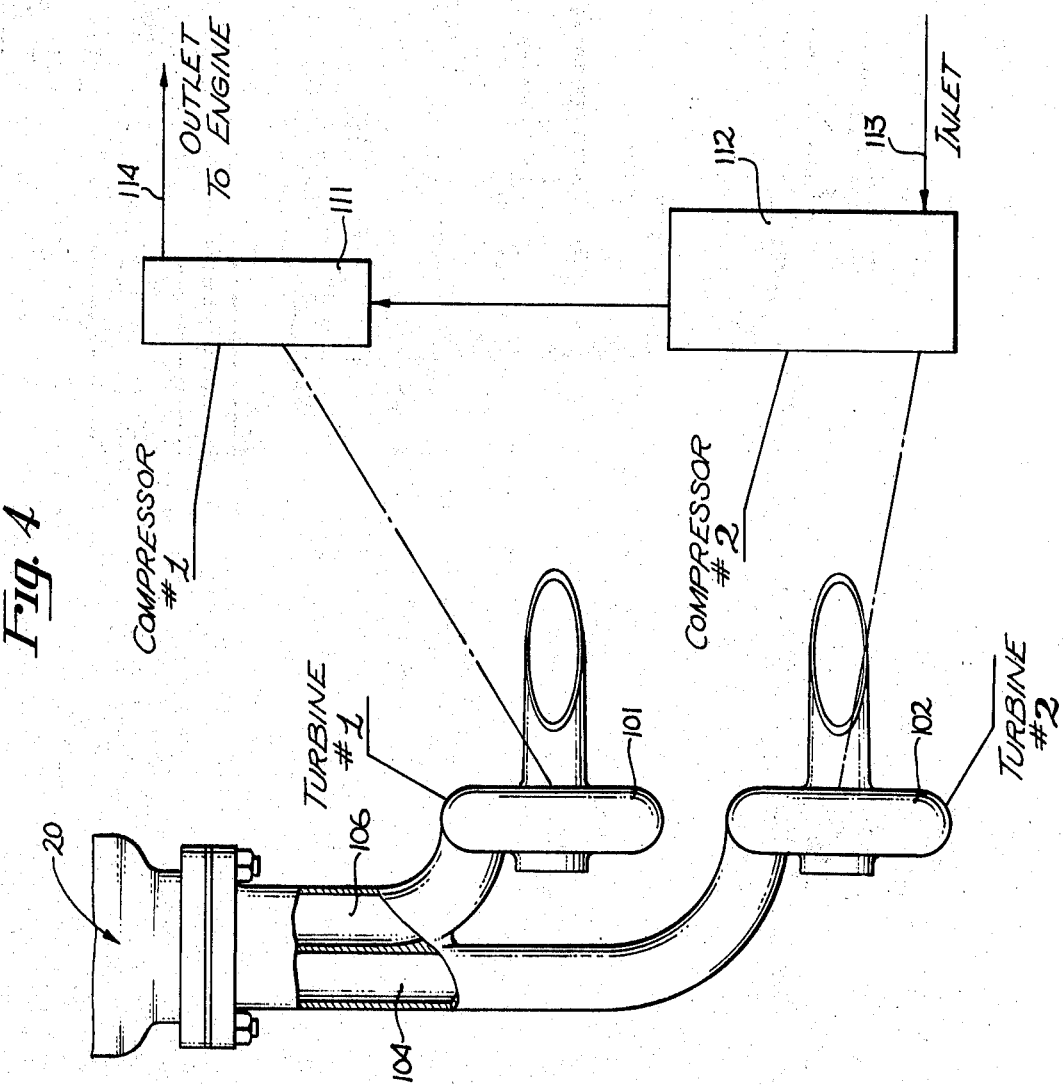

United States Patent Office
3,559,397
Patented Feb. 2, 1971

3,559,397
TURBO SUPERCHARGER CONTROL MECHANISM
Bernard J. Navarro, 720 Geneva St., Glendale, Calif. 91206
Filed Mar. 21, 1969, Ser. No. 809,327
Int. Cl. F02b 37/08
U.S. Cl. 60—13      5 Claims

ABSTRACT OF THE DISCLOSURE

An automatic control mechanism is provided which permits a turbo supercharger to be functional at low engine speeds without sacrificing efficiency at the higher engine speeds. The control mechanism of the invention also serves to remove the inherent rotational lag of the turbo supercharger when the engine is suddenly called upon to produce a high power output. The mechanism of the invention involves a diverter valve which is operated, for example, by intake manifold pressure, and which diverts exhaust gases through a single flow channel at low engine speeds and through two separate flow channels at the higher engine speeds.

BACKGROUND OF THE INVENTION

When an internal combustion engine is equipped with a turbo supercharger in accordance with usual prior art practice, the usefulness of the supercharger is normally limited to a very narrow range of engine speeds. This is because the turbine section of the supercharger assembly depends upon exhaust gas volume and exhaust gas pressure to drive the centrifugal compressor portion of the supercharger.

As is well known, the speed at which an engine can provide sufficient exhaust gas volume to drive the turbine of the turbo supercharger is dependent upon the turbine size. That is, the larger turbine will not function until the engine speed exceeds a relatively high threshold, whereas the small turbine will operate in conjunction with lower engine speeds. However, although the smaller turbine provides a horsepower boost at the lower engine speeds through increased intake manifold pressure, the exhaust pressure becomes too high at the greater engine speeds to maintain efficient operation of such a turbine.

The interal combustion engine equipped with a usual turbo supercharger does not received a boost pressure in the intake manifold while idling or for small throttle openings. Then, if the engine is suddenly required to produce a large power output, there is a relatively long inertial lag time before the turbine and compressor of the turbo supercharger can be accelerated from rest to the rotational speed of the turbine required to produce an intake manifold pressure boost and thereby increase the power capabilities of the engine.

Turbo superchargers which employ a turbine housing with divided sections are known. Such superchargers are intended to be used in conjunction with a split exhaust system of the internal combustion engine. In such a split exhaust system, the exhaust manifolds are separated according to firing order. A first exhaust manifold, for example, couples a first group of cylinders to one section of the housing, and a second exhaust manifold couples a second group of cylinders to the other section of the turbine housing.

It has been found that higher turbine efficiency is obtained by subjecting the turbine to the more pronounced pressure pulses of the split exhaust system described in the preceding paragraph than by using the smoother flow of a single exhaust manifold system. That is, the turbine actually receives more kinetic energy from the fluid pulses of the split exhaust system than from the essentially constant fluid flow derived from the single exhaust system. By separating the exhaust systems according to cylinder firing order, pressure waves alternately travel through each manifold to each section of the turbine housing. With such an arrangement, any cylinder that has both its intake and exhaust valves open during an overlap interval is not subjected to as high an exhaust back-pressure as would be experienced with a common exhaust manifold. The resultant lowering of back-pressure obviously improves the efficiency of the engine.

In the practice of the present invention, and in order to start the turbo supercharger at as low an engine r.p.m. as possible, so as to overcome the aforesaid inertial rotational lag effects, a diverter valve mechanism embodying the concepts of the present invention is controlled initially to cause the exhaust gases from both the exhaust manifolds in a split exhaust system to be directed to one of the split turbine housing sections only. The resulting high flow velocity produced by forcing all the exhaust gases through one small area nozzle ring associated with the split turbine housing section induces sufficient turbine r.p.m. and compressor speed to boost the intake manifold pressure.

As the action described in the preceding paragraph progresses, the intake manifold pressure rises to a predetermined value. When that value is reached, the diverter valve in the mechanism of the invention automatically shifts so that the exhaust gases from each of the split exhaust manifolds are divided into the separate split sections of the turbine housing. Therefore, the turbine drive is switched from a single non-pulsed flow of the exhaust gas drive fluid derived from both sides of the split exhaust system, to a dual pulsed flow from the split exhaust system and into the respective sections of the turbine housing during the higher engine speeds. In this way, the turbine may be designed to have a size compatible with the desired supercharger effect at an elevated engine speed, and yet the turbine is maintained operational at the lower engine speeds so as to avoid the aforesaid inertial lag effect.

BRIEF DESCRIPTION OF THE DRAWINGS

FIG. 4 shows the diverter valve used in conjunction with a double turbo-compressor system.

DETAILED DESCRIPTION OF THE ILLUSTRATED EMBODIMENT

Figure 1:
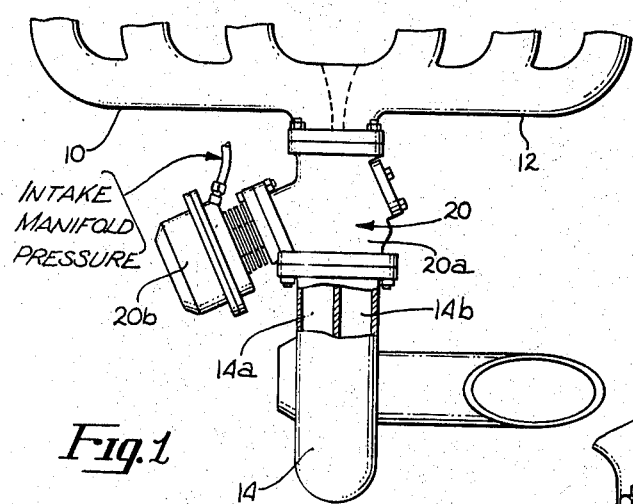
FIG. 1 is a fragmentary view, partially in section, of a split exhaust and turbo supercharger system, and which incorporates the control mechanism of the invention.

The representation of FIG. 1 illustrates a split exhaust system, whereby a pair of exhaust manifolds designated 10 and 12 are coupled to the cylinders of an internal combustion engine (not shown) and in the manner described above, so as to direct the exhaust gases into a turbine housing 14 of a turbo supercharger associated with the internal combustion engine. The turbine housing 14 is of the dual section type, and includes a first turbine housing section 14a and a second turbine housing section 14b. The control mechanism of the present invention, designated 20 is interposed between the turbine housing 14 and the split exhaust manifolds 10 and 12. The mechanism 20 includes a diverter valve 20a, and a pneumatic control for the valve designated 20b. The pneumatic control is coupled to the intake manifold of the internal combustion engine (not shown), and it responds to the intake manifold pressure.

Figure 2:
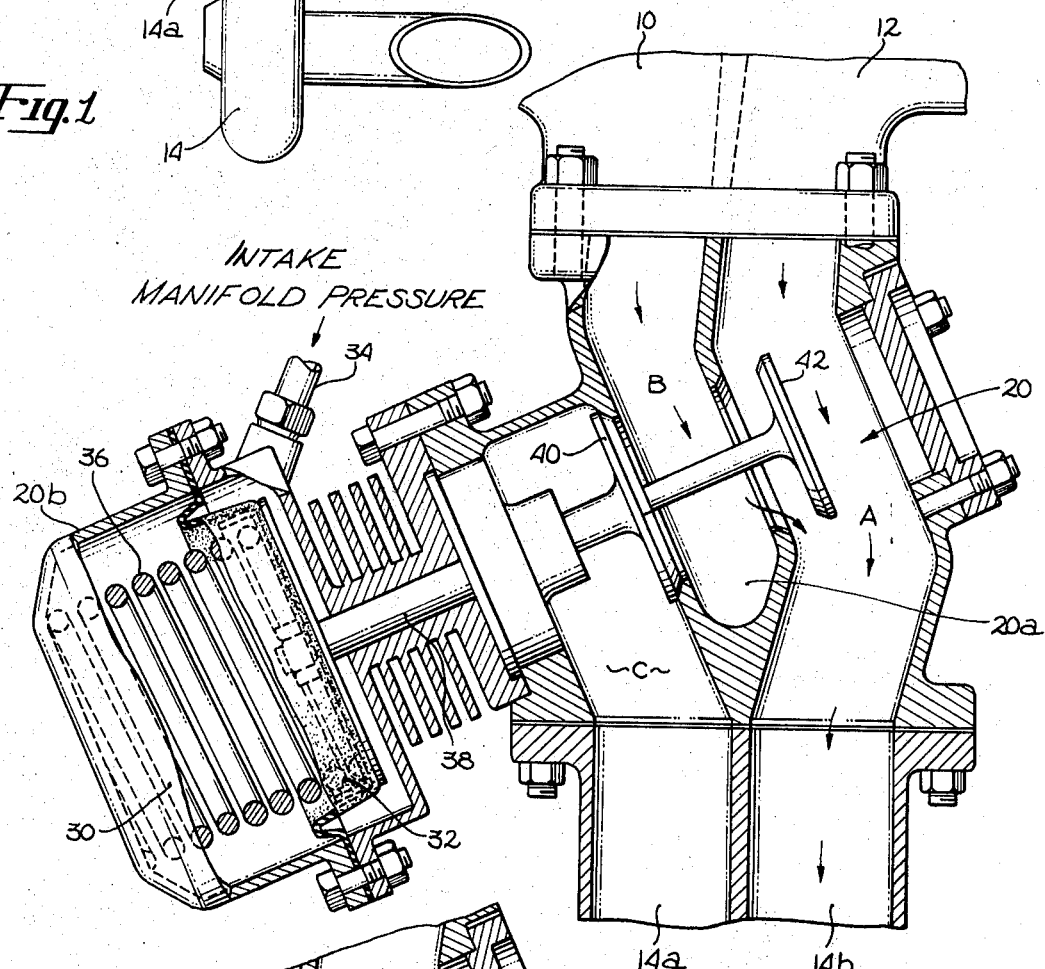
FIG. 2 is a fragmentary sectional view of the mechanism, on an enlarged scale with respect to FIG. 1, and showing the diverter valve of the mechanism in one operating position.

As will be described, when the intake manifold pressure is below a certain predetermined threshold, the control 20b moves the diverter valve 20a to a first position in which the exhaust gases from both the manifolds 10 and 12 are directed into one side 14b of the split turbine housing, such as shown in FIG. 2, and for the reasons explained above. Then, when the pressure at the intake manifold rises above the predetermined threshold, the control 20b causes the diverter valve to move to the position shown in FIG. 3, so that the exhaust gases from the manifolds 10 and 12 are directed respectively to the turbine housing sections 14a and 14b as shown, for example, in FIG. 3.

Figure 3:
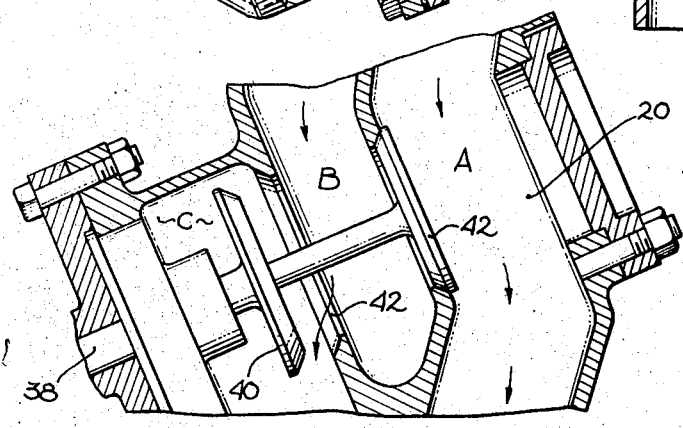
FIG. 3 is yet another fragmentary sectional view of the mechanism, and showing the diverter valve in a second operational position.

As shown in FIGS. 2 and 3, for example, the diverter valve 20a includes a first passageway A which couples the exhaust manifold 12 directly to the turbine housing section 14b. The diverter valve also includes two additional passageways B and C, the passageway C extending to the second turbine housing section 14a, and the passageway B which is coupled to the exhaust manifold 10, being coupled either to the passageway A or to the passageway C, depending upon whether the valve is in the position of FIG. 2 or in the position of FIG. 3.

The control means 20b includes a housing 30, and a diaphragm 32 extends across the housing. An inlet 34 introduces the intake manifold pressure to one side of the diphragm 32, and a spring 36 bears against the opposite side of the diaphragm. A spindle 38 is fastened to the diaphragm, as shown, and the spindle is connected to the valve members 40 and 42 of the valve 20a.

When the manifold pressure is below the predetermined minimum threshold, the spring 36 biases the spindle to the right in FIG. 2, so that the valve member 40 seats on its seat between the passageways B and C. Then when the manifold pressure rises above the minimum threshold, the diaphragm 32 moves against the spring pressure to move the spindle to the position shown in FIG. 3, in which the valve 42 seats on the valve seat between the passageways A and B.

In FIG. 4 the outlets of the diverter valve mechanism 20 are designated 104 and 106. The outlet 104 is coupled to turbine #2 (102), and the outlet 106 is coupled to turbine #1 (101). The turbines 101 and 102 drive compressors 111 and 112 shown schematically in block form. The compressor 112 has roughly twice the capacity of the compressor 111. The compressors are in series, and inlet gases introduced to the compressor 112 at 113 are first compressed by the compressor 112, and the gases from the compressor 112 are subsequently compressed by the compressor 111 and then introduced to the engine at 114.

The turbine #1 (101) and its compressor #1 (111) operates alone when the diverter valve mechanism is in the position shown in FIG. 2, and continue to operate alone until a predetermined boost is attained. Then the divert valve moves to the position of FIG. 3, so that the turbine #2 (102) and compressor #2 (112) also start operating. During the latter mode of operation there is a staging effect, and the gases are first compressed by the compressor #2 (112), and then further compressed by the compressor #1 (111). In this way, a similar effect is achieved as was in the previous embodiment. That is, in the previous embodiment the diverter valve switched the gases from one turbine section to both turbine sections to prevent the turbine inlet pressure from becoming too high. In the latter embodiment the same effect is achieved by switching from one individual turbine to two turbines.

In the manner described, the range of the turbo charger system is increased by using two separate turbo chargers, and by starting with one and subsequently switching to two. In this way boost can be obtained over a wide range without creating excessive turbo inlet pressures which would be detrimental to the function of the engine.

What is claimed is:

1. In an internal combustion engine and turbo supercharger combination, and in which said internal combustion engine includes an intake manifold and a split exhaust system including two separate exhaust manifolds, and in which said turbo supercharger includes first and second turbine means, the combination of a housing defining first and second passageways respectively coupled to said separate exhaust manifolds, said first passageway extending to the intake of said first turbine means, a first port between said first and second passageways, a third passageway extending to the intake of said second turbine means, and a second port between said second and third passageways; a reciprocal type diverter valve assembly interposed between said engine and said turbo supercharger and coupling said exhaust manifolds to said turbine means, said diverter valve assembly having a first valve member for selectively opening and closing said first port and second valve member for selectively closing and opening said second port; and control means for said diverter valve assembly for setting said valve assembly in a first position in which said first valve member opens said first port and said second valve member closes said second port so that exhaust gases from said two separate exhaust manifolds are directed to one of said turbine means, and in a second position in which said first valve member closes said first port and said second valve member opens said second port so that the exhaust gases from said two separate exhaust manifolds are directed to respective ones of said first and second turbine means.

2. The combination defined in claim 1 in which said first and second turbine means comprise a turbine housing with first and second split sections.

3. The combination defined in claim 1 in which said first and second turbine means comprise separate first and second turbines.

4. The combination defined in claim 3 in which said first and second turbine means respectively drive first and second series-connected compressors.

5. The combination defined in claim 1, in which said control means is coupled to the aforesaid intake manifold and responds to a rise in intake manifold pressure above a predetermined threshold value to actuate said valve from said first to said second position.

References Cited

UNITED STATES PATENTS

| 1,816,787 | 7/1931 | Moss | 60—13 |
| 2,444,644 | 7/1948 | Fullemann | 60—13 |
| 2,780,053 | 2/1957 | Cowland | 60—13 |
| 3,270,495 | 9/1966 | Connor | 60—13 |

FOREIGN PATENTS

| 953,933 | 4/1964 | Great Britain | 60—13 |
| 1,337,864 | 8/1963 | France | 60—13 |

DOUGLAS HART, Primary Examiner